Feb. 14, 1928. 1,659,431
W. S. JOSEPHSON
CARBON DIOXIDE FREEZING APPARATUS, METHOD, AND PRODUCT
Filed Dec. 6, 1924
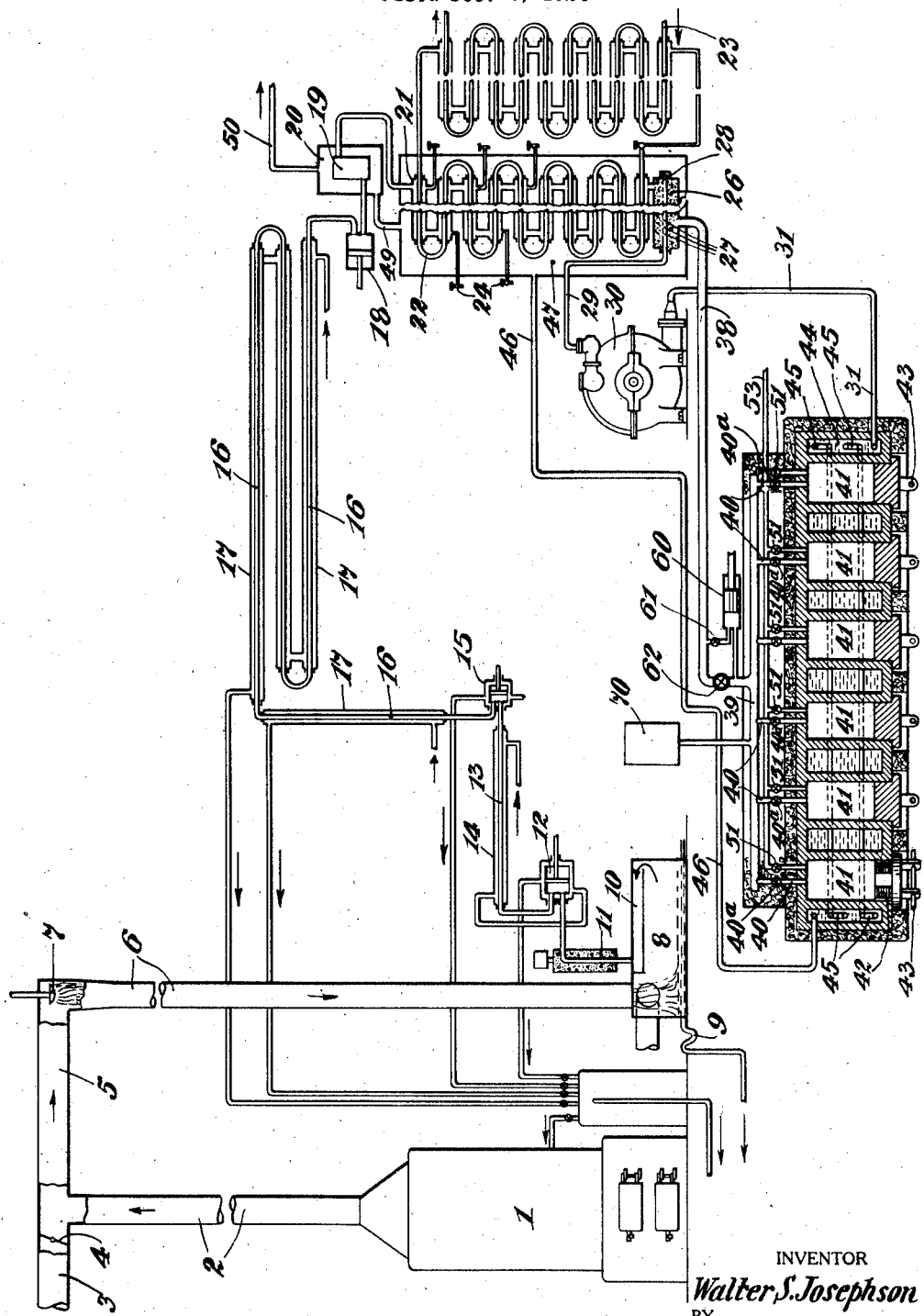
INVENTOR
Walter S. Josephson
BY
George C. Kleau
his ATTORNEY Patented Feb. 14, 1928.

1,659,431

UNITED STATES PATENT OFFICE.

WALTER S. JOSEPHSON, OF BROOKLYN, NEW YORK, ASSIGNOR TO PREST-AIR CORPORATION, OF NEW YORK, N. Y., A CORPORATION OF DELAWARE.

CARBON-DIOXIDE-FREEZING APPARATUS, METHOD, AND PRODUCT.

Application filed December 6, 1924. Serial No. 754,376.

My present invention relates more particularly to freezing of carbon dioxide in a liquid state to form a cake of ice as distinguished from compressing carbon dioxide snow formed in the usual well-known manner by sudden release of liquid carbon dioxide under pressure. The principal feature of the invention is production of a transparent crystal block of the ice in forms free from pores or bubbles, so that it will melt much slower than the ice compressed from snow, so that it will have structural strength necessary to withstand rough handling without breaking and so that it will be of great density, thereby embodying a greater amount of the carbon dioxide refrigerant in a smaller space than has heretofore been possible.

I find that the liquid carbon dioxide when frozen in mass by an externally applied refrigerant contracts enormously in volume and even though the liquid in the container be under enormous pressure when the freezing commenced, the contraction will relieve that pressure with the result that the final solidification takes place under relatively low pressure conditions, with the result that the product is of low density and is in considerable part a mere agglomeration of crystals having very little coherence or structural strength. I have discovered that an important factor in this is the peculiar quality of liquid carbon dioxide which makes it different from all ordinary liquids with which I am acquainted. Ordinary liquids are almost incompressible, the compressibility of water being notoriously small, whereas carbon dioxide in liquid form has extraordinary compressibility, expanding and contracting with variations of pressure in a manner analogous to a gas, although it obviously is not a gas because it has a surface, meniscus, and absorbs latent heat when changing from gas to liquid.

The above will serve to explain my present invention, which includes freezing of the liquid carbon dioxide under relatively enormous pressure applied continuously throughout the freezing operation. A preferred and very desirable feature is to maintain the pressure from a source of continuous supply of the liquid which will be forced into the freezing chamber to fill up interspaces and maintain pressures throughout the block until it is completely solidified.

In the latter connection, I find that it is difficult to maintain the partly frozen ice submerged in and bathed by a solid body of liquid unless the pressures are not only followed up and maintained, but are also maintained at a relatively high value.

I find that when frozen under a maintained, follow-up liquid pressure of, say, 150 lbs. to the square inch, the ice will have a specific gravity practically the same as that of water, whereas the same method with the pressure kept up to 850 lbs. to the square inch will give a density of 86 lbs. to the cubic foot and with sufficient pressure, say, somewhere between 1500 and 2500 lbs. per square inch, the density of the ice can be carried up to 95 lbs. or even 100 lbs. or more per cubic foot. This 95 lbs. weight represents a phenomenal increase of density of 50% as compared with ice made with precisely the same method with approximately only 150 lbs. to the square inch. The important feature is that the quality of structural strength, durability and transparent crystalline appearance increase with each of the above mentioned increases of freezing pressure.

A minor feature of my method includes a continuous process of making a liquid carbon dioxide from flue gases, lime kiln gases, etc., rich in carbon dioxide, by progressive freezing and cooling operations resulting in condensing out of the liquid carbon dioxide and leaving highly compressed very cold nitrogen as a by-product which I expand, preferably in a turbine or Pelton wheel rotary motor to produce power, thereby further lowering the temperature of the nitrogen to as low temperature as may be desired for using it as the refrigerant for freezing the liquid carbon dioxide.

The above and other features of my invention will be more evident from the detailed description in connection with the accompanying drawing, which is a diagram of a plant for practice of my method.

In the drawing, 1 is a coke furnace, lime kiln or other source of gas rich in carbon dioxide. The gas flows upward through stack 2, which is provided with an outlet 3 to the open air through which it may be discharged until perfect combustion conditions are established in the generator 1. Thereafter the damper 4 is closed and the gas is passed through conduit pipe 5 and downflow pipe 6 which is a cooling and scrubbing conduit supplied with water sprayed from nozzle 7. The water and washed gas pass into chamber 8, whence the water flows out through trap 9 while the gas passes out above baffle plate 10 into a filter like chamber 11 in which tar oil and other impurities are removed. Thence the cleaned and cooled gas goes to the first stage compressor 12, where it is compressed to, say, 50 lbs., thence through pipe 13 having a water cooling jacket 14, thence to the second stage compressor 15, where the pressure may be raised to 250 lbs., thence through pipe 16 having water jackets 17, and thence to the third stage compressor 18, where the pressure is raised to, say, 750 lbs. or more. Thence the gas passes to the freezing-out dehydrator 19, maintained at the known low temperature required for freezing out the water by intensely cold exhaust nitrogen which flows through the jacket 20, the mode of supply of such nitrogen being explained below.

From the dehydrator, the carbon dioxide under pressure of, say, 50 to 60 atmospheres, flows into the outer tube 21 of the countercurrent heat exchanger which is kept at the required low temperature by a suitable liquid carrying medium such as brine or ether circulating in pipe 22, which traverses the successive zig-zag lengths of jacket pipe 21. The circulating medium in pipe 22 is kept cold by a refrigerant medium in pipe 23, the same being supplied from any desired refrigerating machine (not shown).

The cocks 24 are merely traps from which may be drawn off undesirable condensates of higher condensing point than the carbon dioxide. By the time the carbon dioxide has reached the bottom of the heat exchanger, it is cooled to temperature of liquefaction say, −50° F. and flows into a separating chamber 26, which may be filled with brick or other baffling means to promote separation of the liquid carbon dioxide from the nitrogen gas. The nitrogen gas passes out through perforations 27 in the top of pipe 28 and through pipe 29 to the rotary expansion motor 30 which is preferably of the turbine or Pelton wheel type. Here the nitrogen, being expanded to as near atmosphere as may be desired, has its temperature lowered by the expansion to, say, 200° to 300° below zero F., whence it flows through pipe 31 to the freezer for the carbon dioxide.

All of the parts up to this point are conventionally indicated, since they may be of any known or desired construction employed in machines for making liquid carbon dioxide.

The liquid carbon dioxide from separating chamber 28 passes through pipe 38 to distributing manifold 39 and thence through parallel pipes 40 to the freezing chambers 41, six of which are diagrammatically indicated in the drawing. They are each provided with bottom closures, preferably made quickly detachable by employment of interrupted screw threads 42 arranged and operating after the manner of breech blocks of breech loading artillery. Means for giving the breech blocks a quarter turn to free the threads and to permit axial removal of the blocks are indicated at 43.

The ice chambers are surrounded by a freezer chamber in which refrigerant may be applied in any desired way. Preferably, however, a liquid medium such as ether, diagrammatically indicated at 44, is kept cool by the nitrogen from pipe 31 which traverses the bottom coil and then successively higher coils 45, 45, the top coil discharging through pipe 46 leading to an insulated jacket 47 which surrounds the countercurrent condenser apparatus previously described. From this jacket the nitrogen passes through pipe 49 to the jacket 20 of the freezing dehydrator above described. Thence it escapes through pipe 50, which may lead to a nitrogen fixing plant.

The ice chambers 41 have the outlets controlled by valves 51 communicating with a common discharge pipe 53. As the carbon dioxide escaping through this pipe is pure and intensely cold, it may be compressed and put back through the countercurrent condenser or may be returned to the line through the intake to the third stage compressor 18.

An important feature is the relatively small-volume, high-power liquid pressure pump 60, which is in operative relation to the liquid supply line 38 for maintaining the desired follow-up supply and pressure on the liquid during the freezing operation.

The operation of the freezing plant is as follows:

Pump valve 61 is closed and the gravity supply valve 62 and branch supply valves 40ᵃ' are opened. The liquid then flows through manifold 39 and branch pipes 40 until all of the ice chambers 41 are filled with liquid at approximately the pressure and temperature of the source which, as above stated, is 50 to 60 atmospheres and say, 40° to 50° below zero F. The valve 62 is then closed and valve 61 opened, so that the pressure supply pump 60 becomes operative. For practical reasons, this pump is usually of the reciprocating type and hence the pressure applied thereby may be variable, but this is not likely to make trouble because this pump is of relatively small volume and the resiliency of the liquid is analogous to that of a gas. However, I may use additional means, such as a by-pass relief or safety valve, or I may provide a gas collecting chamber 70 exposed to ordinary atmospheric temperature, so that part or all of the carbon dioxide therein will be in gas form and will operate to afford a wider range of resilience for the liquid in manifold 39, branch pipes 40 and ice chambers 41, during intake strokes of the pump 60. The pressure being maintained by any suitable means at the above described pressures of 1500 pounds to 2000 pounds or more, throughout the freezing operation, the resultant blocks of ice will have the above described novel and highly desirable features. When the block is frozen, the supply valves 40ª are closed, the outlet valves 51 are opened to relieve any possible pressure of gas remaining in the ice chambers 41. Thereupon, the breech block bottoms are opened for removal of the ice cakes. The ice chambers 41 are slightly coned or inclined inward from bottom to top, so that the ice blocks are likely to fall free, but if any of them stick, they can be easily ejected by operating the supply valves 40ª to apply whatever pressure may be necessary.

It will be evident that while I have shown one apparatus whereby my method may be practiced, the desired constant or follow-up pressure may be applied in other ways, as, for instance, by pistons forced downward upon the liquid in the ice chambers 41 after the chamber has been filled and cut off; the removable breech blocks may be held in any desired way as, for instance, by hydraulic pressure; and the freezing refrigerant may be supplied by any suitable refrigerating machine instead of by the expanded nitrogen product as above described.

From the above, it will be evident that certain distinctions and variations are worthy of note:

First, I prefer to maintain a fairly constant pressure during the entire freezing operation, thereby obtaining an ice product in which all parts of the block are of the same or at least approximately similar densities, thereby minimizing internal structural strains or weaknesses such as may result where adjacent portions are successively frozen under substantially different pressures, establishing different conditions or degrees of molecular stress or structure or different coefficients of expansion.

Second, I prefer a follow-up, liquid pressure whereby the freezing portions are prevented from shrinking out of touch with the liquid at any instant during the freezing of the entire block.

Third, the above preferred conditions may be departed from very widely during the first part of the freezing process, provided that during the period of final freezing up of the block, the liquid is maintained between and in intimate contact with the surfaces of the previously frozen portions. For instance and as an extreme case, the chambers could be filled, closed and allowed to freeze without follow-up pressure, thus producing a block with a shrunk-apart, hollow or porous core, a desirable final product being produced therefrom as before, that is, by flooding with liquid and maintaining a high pressure follow-up supply of the liquid during the final solid freezing of the block.

In both these cases, the completed block would include portions of widely varying densities but the first-frozen parts would be welded together by the final high pressure freezing of the added liquid in which said parts are submerged; and such products and methods are within the broader scope or aspect of my present invention.

While it is industrially convenient to be satisfied with the initial condensation temperature of the liquid, say −50° F., as a sufficiently low temperature for the liquid at the time it is charged into the freezers, there is an important modification greatly reducing the freezing time and decreasing or obviating the necessity for a large-quantity, follow-up inflow of relatively warmer liquid into the freezer molds during the freezing. This involves precooling the liquid practically to freezing point, say, −110° F. or even to −114° F. before charging it into the freezer. In such case and with pressures of, say, 60 atmospheres, the liquid in the supply pipes or manifold will be sufficiently elastic to take care of any small remnant of contraction or expansion that may attend change of liquid at freezing temperature to ice at the same temperature. Such elasticity will also be sufficient for this purpose with substantially higher initial temperatures.

In this connection, it may be noted that there is advantage in having an initial production temperature for the liquid that is anywhere below −67° F., since this is approximately the critical temperature where the liquid ceases to change readily from liquid to gas and vice versa, in direct response to changes of pressure.

The significance of my above invention will be evident to those familiar with the modern art of refrigeration as set forth in Slate Patent No. 1,511,306, granted October 14, 1924 (see Fig. 7); and in certain applications including Slate Ser. No. 740.162, and Slate and Josephson Ser. No. 736,954. An important novel feature of this art is manufacture and distribution of carbon dioxide ice in large cakes or blocks, a convenient size being hundred pound blocks. These may be cylinders of one cubic foot volume and having diameter equal axial length, if desired. This is a new idea and making such large cakes from the liquid by the ancient method of expansion to produce snow and then compressing the snow, has resulted in cakes that contain too much water-ice; are less dense and more bulky than desirable; are too porous, exposing too much evaporative surface to the air; are of inferior structural strength and are lacking in the translucence that the public has come to associate with first quality water-ice. Obviously, my present inventions result in radical improvement in every one of these practically important details; in fact, ice made by my methods can be handled in the open air with minimum waste and may be kept or transported for long periods by merely excluding air, as by a paper or other wrapper of impervious material such as paraffined paper, oiled silk, "oil-skin," etc.

An important novelty of the method depends on recognition of the phenomenal eccentricity of liquid carbon dioxide in that its volume can be condensed to one-half or even one-third by sufficient pressure and that such reduced volume can be realized in the ice by the methods above described.

I claim:

1. Apparatus of the class described, including a source of gaseous mixture containing carbon dioxide, pressure and cooling means for liquefying and separating the liquid carbon dioxide from the other gaseous constituents together with means for expanding the latter, in combination with means for freezing said liquid, including a freezing mold or chamber, a connecting conduit through which the liquid carbon dioxide flows under a liquefying pressure from the separating means to fill said chamber, and a refrigerating jacket and means for refrigerating said jacket below the freezing point of said liquid, by heat transfer means in operative relation to said expanded cold gas from which said liquid has been separated, together with means for maintaining a very high pressure, follow-up feed of liquid into the chamber while the freezing of the liquid in the chamber is being completed, and means for releasing pressure and removal of the completed block.

2. Apparatus of the class described, including a source of gaseous mixture containing carbon dioxide, pressure and cooling means for liquefying and separating the liquid carbon dioxide from the other gaseous constituents together with means for expanding the latter, in combination with means for freezing said liquid, including a freezing mold or chamber, a connecting conduit through which the liquid carbon dioxide flows under a liquefying pressure from the separating means to fill said chamber, and a refrigerating jacket and means for refrigerating said jacket below the freezing point of said liquid, by heat transfer means in operative relation to said expanded cold gas from which said liquid has been separated, together with means for maintaining relatively constant high pressure on the liquid in said chamber throughout the entire freezing operation, to produce a solid block of approximately uniform high density.

3. Apparatus of the class described, including a source of gaseous mixture containing carbon dioxide, pressure and cooling means for liquefying and separating the carbon dioxide from other constituents of the mixture and recovering both under high pressures at low temperatures and means for expanding said other constituents, in combination with means for freezing the liquid, including a freezing mold or chamber, connecting conduit through which the liquid carbon dioxide flows under the initial pressure directly from the separating means into said mold, and a refrigerating jacket and means for refrigerating said jacket by said expanded cold gas from which said liquid has been separated, together with a high pressure pump for maintaining a very high pressure and a follow-up feed of liquid into the chamber until the freezing of all the liquid in the chamber has been completed.

4. Apparatus for making blocks of carbon dioxide ice, including a source of liquid carbon dioxide, in combination with a freezing apparatus, including a freezing mold or chamber and connecting conduit through which the liquid carbon dioxide flows to fill said chamber and a refrigerating jacket with means for refrigerating said jacket below the freezing point of said liquid carbon dioxide, together with means for maintaining pressure within the mold to keep the liquid in bathing contact with the solidifying ice until the block is completely frozen.

5. Apparatus for making blocks of carbon dioxide ice, including a source of liquid carbon dioxide, in combination with a freezing apparatus, including a freezing mold or chamber and connecting conduit through which the liquid carbon dioxide flows to fill said chamber and a refrigerating jacket with means for refrigerating said jacket below the freezing point of said liquid carbon dioxide, together with means for maintaining relatively constant high pressure on the liquid in said chamber throughout the entire freezing operation, to produce a solid block of approximately uniform high density.

6. The method of making solid blocks of carbon dioxide ice, which includes charging liquid carbon dioxide at high pressure and low temperature, into an ice freezing chamber or mold; maintaining in said mold temperatures substantially below the freezing point of said liquid; applying on the liquid carbon dioxide in said mold or chamber approximately uniform pressure and maintaining said pressure during the freezing operation to produce a block of approximately uniform density.

7. The method of making solid blocks of carbon dioxide ice, which includes charging liquid carbon dioxide at high pressure and low temperature, into an ice freezing chamber or mold; maintaining in said mold temperatures substantially below the freezing point of said liquid; applying on the liquid carbon dioxide in said mold or chamber follow-up liquid pressures of the order of 1500 lbs. to 2000 lbs. per square inch, for the purpose described.

8. The method of making solid blocks of carbon dioxide ice, which includes compressing and cooling flue gas or the like and thereby liquefying the carbon dioxide thereof to produce separate liquid carbon dioxide and gaseous nitrogen products, both under the usual high pressures and at the usual low temperatures; discharging the cold liquid as formed into ice freezing molds or chambers; maintaining freezing temperatures in said chambers by expanding the nitrogen in a cold gas expansion motor to reduce its temperature substantially below the freezing point of carbon dioxide and utilizing it as heat absorbing means for refrigerating a suitable liquid medium which is in bathing contact with the exterior of the ice chamber; applying upon the liquid carbon dioxide in said chamber pressures approximately double the condensing pressure, and maintaining said pressure during the entire freezing operation.

9. The method of making solid blocks of carbon dioxide ice, which includes compressing and cooling flue gas or the like and thereby liquefying the carbon dioxide thereof to produce separate liquid carbon dioxide and gaseous nitrogen products, both under the usual high pressures and at the usual low temperatures; discharging the cold liquid as formed into ice freezing molds or chambers; maintaining freezing temperatures in said chambers by expanding the nitrogen in a cold gas expansion motor to reduce its temperature substantially below the freezing point of carbon dioxide and utilizing it as heat absorbing means for refrigerating a suitable liquid medium which is in bathing contact with the exterior of the ice chamber; applying upon the liquid carbon dioxide in said chamber pressures approximately double the condensing pressure during the final stages of the freezing operation.

10. The method of making a structurally solid block of carbon dioxide ice which consists in freezing a body of liquid carbon dioxide and maintaining approximately constant pressure thereon during the final stage of the freezing operation.

11. The method of making a structurally solid block of carbon dioxide ice which consists in freezing a body of liquid carbon dioxide and maintaining approximately constant pressure thereon during all stages of the freezing operation.

12. The method of making a structurally solid block of carbon dioxide ice which consists in freezing a body of liquid carbon dioxide and maintaining approximately constant pressure thereon during the final stage of the freezing operation, said pressure being of the order of 1500 lbs. to 2500 lbs. per square inch.

13. The method of making a structurally solid block of carbon dioxide ice which consists in freezing a body of liquid carbon dioxide and maintaining approximately constant pressure thereon during all stages of the freezing operation, said pressure being of the order of 1500 lbs. to 2500 lbs. per square inch.

14. As an article of manufacture, a mass or block of carbon dioxide, frozen under sustained liquefying pressure.

15. As an article of manufacture, a mass or block of carbon dioxide ice of approximately uniform density, frozen under liquefying pressure.

16. As an article of manufacture, a mass or block of carbon dioxide ice having a specific gravity more than 30% greater than water.

17. As an article of manufacture, a mass or block of carbon dioxide ice of approximately uniform density having a specific gravity more than 30% greater than water.

18. As an article of manufacture, a structurally strong block of translucent carbon dioxide ice, frozen under liquefying pressure.

19. As an article of manufacture, a structurally strong block of translucent carbon dioxide ice of approximately uniform density, frozen under liquefying pressure.

20. As an article of manufacture, a structurally strong block of translucent carbon dioxide ice having a specific gravity more than 30% greater than water.

21. As an article of manufacture, a structurally strong block of translucent carbon dioxide ice of approximately uniform density having a specific gravity more than 30% greater than water.

22. As an article of manufacture, a structurally strong block of translucent carbon dioxide ice made structurally strong and of approximately uniform density by liquefying pressure thereon during the final stages of freezing.

23. As an article of manufacture, a structurally strong block of translucent carbon dioxide ice made structurally strong and of approximately uniform density by liquefying pressure thereon through the entire freezing operation.

24. As an article of manufacture, a solid, coherent mass of carbon dioxide ice, having a density corresponding to a weight of more than 85 lbs. per cubic foot due to freezing the same from liquid while compressed to correspondingly high density.

25. The method of making the carbon dioxide ice which includes cooling liquid carbon dioxide below —67° F.; then charging the same into a mold and freezing it while maintaining a follow-up pressure thereon.

26. The method of making the carbon dioxide ice which includes cooling liquid carbon dioxide to approximately its freezing point; then charging the same into a mold and freezing it while maintaining a follow-up pressure thereon.

Signed at New York, in the county of New York, and State of New York, December, A. D. 1924.

WALTER S. JOSEPHSON.